United States Patent [19]

Winter-Peter

[11] Patent Number: 4,458,551
[45] Date of Patent: Jul. 10, 1984

[54] MANUAL TRANSMISSION

[75] Inventor: Wolfgang Winter-Peter, Cologne, Fed. Rep. of Germany

[73] Assignee: Ford Motor Company, Dearborn, Mich.

[21] Appl. No.: 263,539

[22] Filed: May 14, 1981

[30] Foreign Application Priority Data

Jan. 21, 1980 [DE] Fed. Rep. of Germany ....... 3001935

[51] Int. Cl.³ .......................... F16H 3/08; G05G 5/10
[52] U.S. Cl. ....................................... 74/477; 74/331; 74/359; 74/360
[58] Field of Search ..................... 74/477, 473 R, 357, 74/359, 360, 331

[56] References Cited

U.S. PATENT DOCUMENTS

| | | | |
|---|---|---|---|
| 2,220,543 | 11/1940 | Peterson | 74/477 |
| 2,633,753 | 4/1953 | Campodonico | 74/331 |
| 2,942,492 | 6/1960 | Haelsig et al. | 74/477 |
| 3,264,893 | 8/1966 | Stott et al. | 74/473 |
| 3,318,167 | 5/1967 | Frost | 74/331 |
| 3,465,613 | 9/1969 | Henry-Biabaud | 74/606 |
| 3,929,029 | 12/1975 | Kelbel | 74/477 |
| 3,962,930 | 6/1976 | Frazee | 74/477 |
| 4,106,358 | 8/1978 | Morrison | 74/360 |
| 4,136,574 | 1/1979 | Morrison | 74/359 |
| 4,222,281 | 9/1980 | Mylenek | 74/473 R |

FOREIGN PATENT DOCUMENTS

| | | |
|---|---|---|
| 864514 | 12/1952 | Fed. Rep. of Germany . |
| 883691 | 6/1953 | Fed. Rep. of Germany . |
| 941713 | 10/1955 | Fed. Rep. of Germany . |
| 1116544 | 11/1961 | Fed. Rep. of Germany . |
| 1500367 | 5/1974 | Fed. Rep. of Germany . |
| 2538230 | 9/1976 | Fed. Rep. of Germany . |
| 2312867 | 11/1979 | Fed. Rep. of Germany . |

Primary Examiner—Allan D. Herrmann
Assistant Examiner—D. Wright
Attorney, Agent, or Firm—Frank G. McKenzie; Donald G. Harrington

[57] ABSTRACT

A variable speed ratio manual transmission includes two intermediate shafts straddling an output shaft that is coaxial with an input shaft; each intermediate shaft and the output shaft carries a synchronizer coupling. Each shaft carries at least one journalled pinion and has at least one pinion drivably connected to the shaft. The gear selector mechanism includes a shift rail having a selector finger angularly movable with respect to shift forks. A check plate locked against axial displacement prevents movement of the unselected shift forks. Shift rail motion is transmitted to the selected shift forks of the intermediate shafts by auxiliary arms that extend radially from the shift rail into selected engagement with the shift forks.

3 Claims, 5 Drawing Figures

MANUAL TRANSISSION

BACKGROUND OF THE INVENTION

1. Field of the Invention This invention relates to a variable speed transmission for motor vehicles. More particularly this invention pertains to a manual transmission having three axes upon which the drive elements are mounted.

2. Description of the Prior Art German Pat. No. 833,691 describes a variable speed transmission having a drive shaft with a fixed pinion which can be driven by an input coupling, an output shaft coaxial with the drive shaft having at least one fixed output pinion and two intermediate shafts disposed parallel to and separate from the axis of the drive shafts. The output shaft is driven from the intermediate shafts when synchronized couplings are moved to produce a driving connection. In this transmission, however, a double clutch with two separately controllable coupling disks is required in order to engage five forward gears, of which the fifth gear is a direct gear. The transmission allows selective operation of two separate coaxial drive shafts by selectively coupling clutches located on the output shafts and the two intermediate shafts.

The prior art transmission has the advantage of a simple, compact construction and uses identical parts for several different functions. The transmission, however, has the disadvantage that high cost is required to produce the double clutch and it lacks a reverse gear which motor vehicles require.

SUMMARY OF THE INVENTION

The purpose of the present invention is to improve a variable speed transmission of this type so that five forward speed ratios and one reverse speed ratio are provided, whereby the fourth speed ratio is a direct drive, the fifth speed ratio is an overdrive and all of the forward and reverse gear ratio connections are synchronously made. It is a further object of this invention that the manual transmission be of a compact design having one synchronizer coupling on the output shaft and one synchronizer coupling on each intermediate shaft.

The variable speed ratio manual transmission made according to this invention includes an input shaft having an integrally formed drive pinion. The output shaft carries a first journalled pinion, a first synchronizer coupling adapted to selectively and driveably connect the input shaft to the output shaft and the first pinion to the output shaft, and four pinions driveably fixed to the shaft. A first intermediate shaft has two pinions located on opposite axial ends of the first synchronizer coupling, each driveably fixed to the shaft. A second synchronizer coupling mounted on the first intermediate shaft selectively and driveably connects two journalled pinions to the first intermediate shaft. A second intermediate shaft has a pinion driveably fixed thereon in continuous engagement with the drive pinion, a third synchronizer coupling and two journalled pinions that are driveably connected to the second intermediate shaft by selective operation of the third coupling. A reverse idler pinion is movable into engagement with reverse drive pinions on the output shaft and on the second intermediate shaft.

The transmission, therefore, has a first intermediate shaft carrying two fixed pinions located one on each axial end of the first synchronizer coupling and two journalled pinions. A second intermediate shaft has one fixed pinion and two journalled pinions, one on each side of a second synchronizer coupling. The output shaft has another synchronizer coupling located adjacent the end of the input shaft, a journalled pinion and four fixed pinions. One of the fixed pinions is indirectly driven by the pinion that is journalled on the second intermediate shaft when a reversing idler pinion is interconnected. The three other pinions that are fixed on the output shaft engage continuously with corresponding journalled pinions on either of the intermediate shafts. In this way, five forward speed ratios and one reverse drive ratio can be produced in an extremely compact gear arrangement. The fourth gear ratio may be a direct drive gear ratio and the fifth gear ratio may be an overdrive ratio.

The gear ratios are selected by the vehicle operator by control movement applied to a shift rail having a selector finger which moves between recesses formed on shift forks that control the motion of the three synchronizer couplings. A checkplate is fixed in the transmission housing against axial movement and acts to block the movement of two of the shift forks while permitting axial movement of the one shift fork with which the selector finger is engaged. Integrally formed with the selector finger and extending radially outward from the shift rail are two auxiliary arms that each terminate adjacent one of the two shift forks that control the movement of the synchronizer couplings on the intermediate shafts. When the shift rail is rotated about its axis thus bringing the selector finger into engagement with the selected shift fork, the corresponding auxiliary arm engages a lug formed on the selected shift fork. In this way, the selected shift fork may be moved axially along the shaft upon which it is mounted either solely by the engagement of the fork lug with the auxiliary arm or conjunctively by the effect of the engagement of the selector finger with the fork and the fork lug with the arm.

The transmission housing includes two axial portions mechanically joined at a junction that runs generally perpendicular to the axis of the input and output shafts and is located approximately at the midpoint of the length of the auxiliary shafts and of the transmission housing. The front portion of the transmission housing is integrally formed with a clutch housing and the rear portion of the housing is formed integrally with a connecting housing for a connector that leads to the rear axle of the vehicle. The housing parts may be made of die cast aluminum.

In the front housing portion of the transmission case there is provided a space to hold a bearing block in which the reverse idler pinion is preassembled and mounted for easy assembly within the gearbox.

BRIEF DESCRIPTION OF THE DRAWING

The invention is explained in more detail with reference to the accompanying drawings.

DESCRIPTION OF THE PREFERRED EMBODIMENTS

Figure 1:
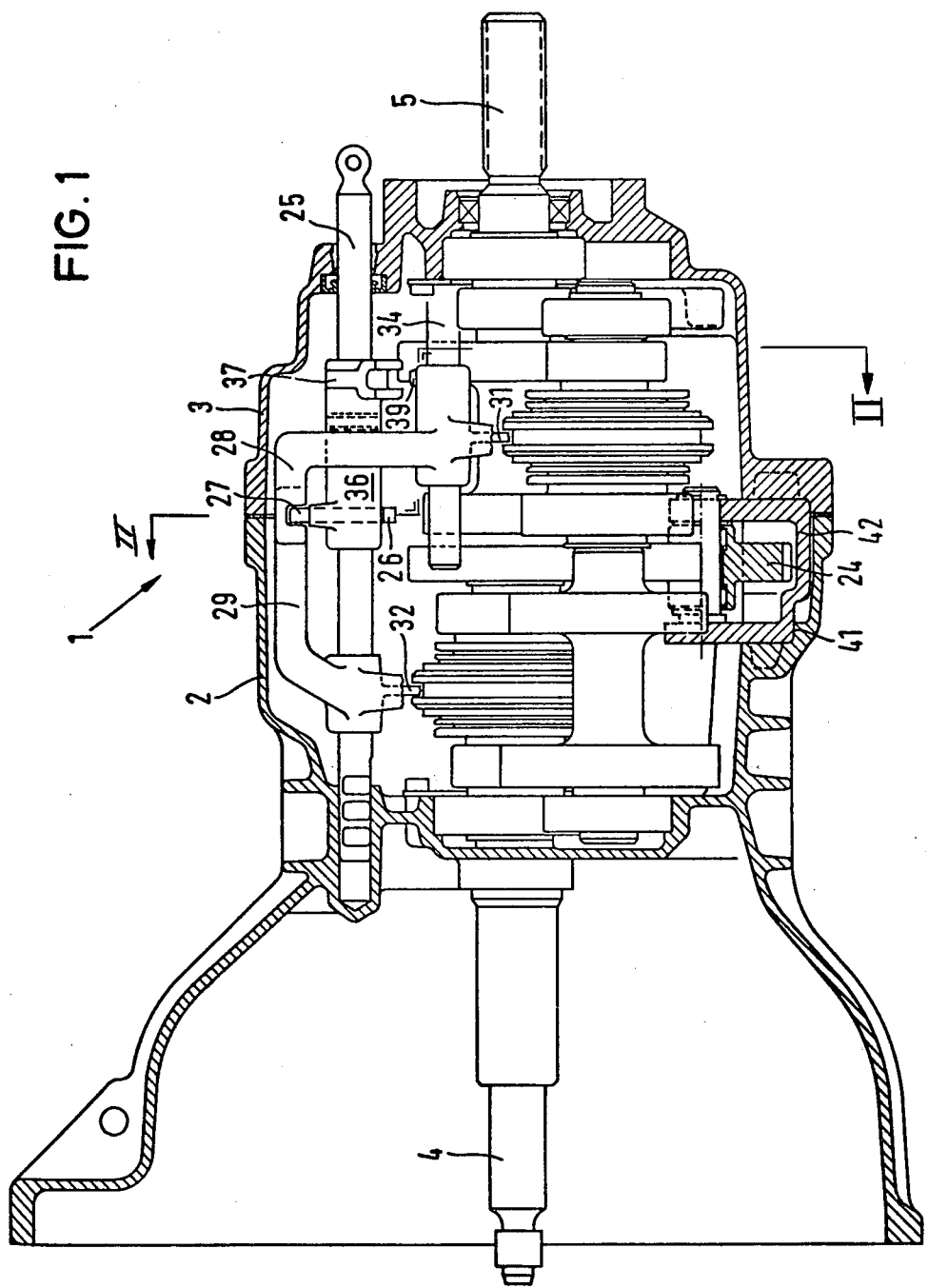
FIG. 1 is a side view of a variable speed manual transmission according to this invention, a cross section being taken through the gear box housings.
Figure 2:
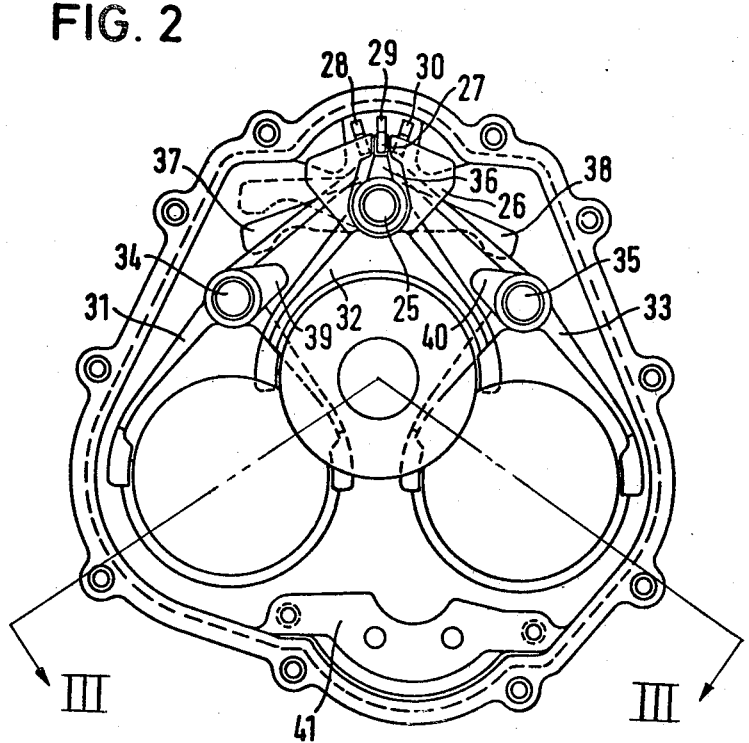
FIG. 2 is a view toward the front portion of the transmission of FIG. 1 as seen at the discontinuous plane II—II of FIG. 1, but only the gear shift sleeve and the shifting linkage are illustrated in detail.
Figure 3:
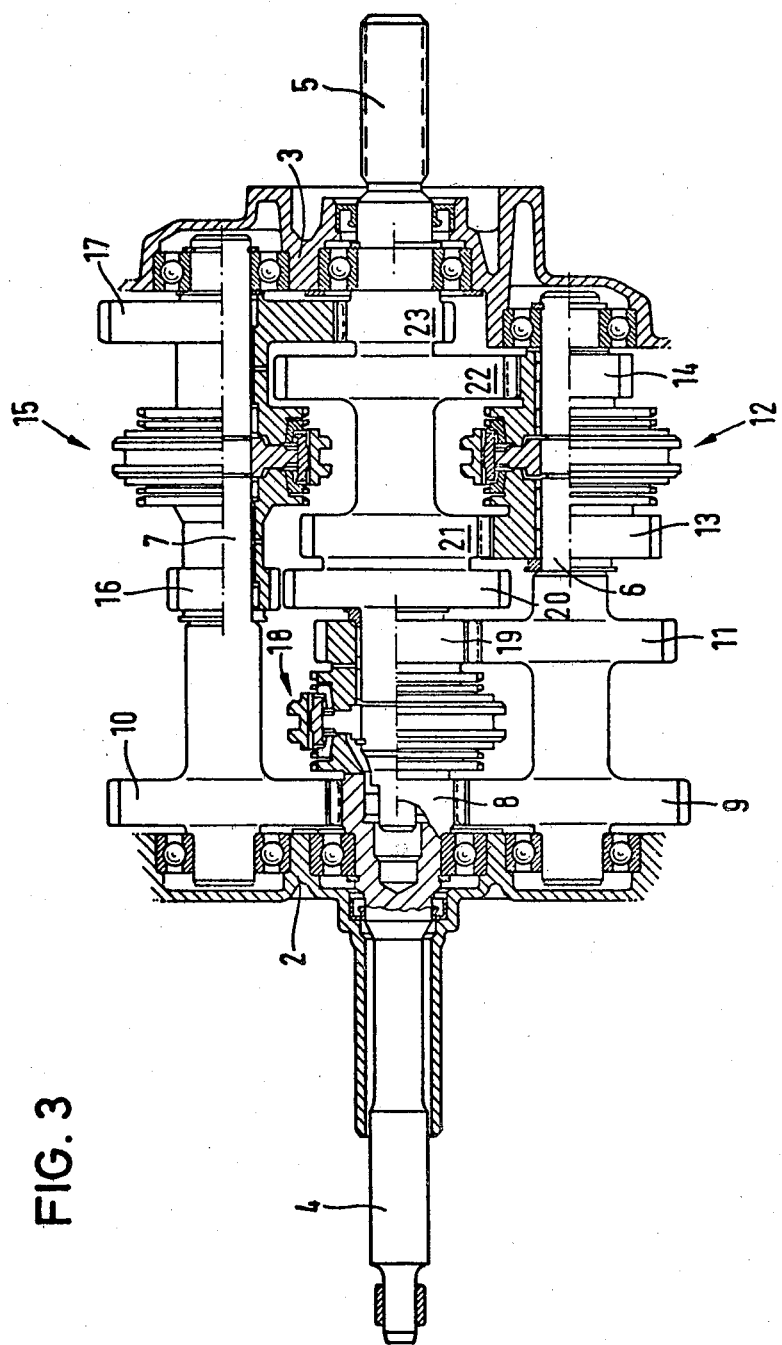
FIG. 3 is a view partially in cross section through the centerlines of the three shafts on which the gears are mounted taken at plane III—III of FIG. 2.

As can be seen in the views shown in FIGS. 1-3, the variable speed transmission according to this invention has the gears mounted on three parallel shafts. In the gear box 1, which includes a front housing part 2 and a rear housing part 3, are located a drive shaft 4, output shaft 5 coaxial with shaft 4, and parallel intermediate shafts 6 and 7 on opposite sides of shafts 4 and 5.

The two housing parts 2 and 3 are threaded together along a junction located approximately in the center of the gear box and directed perpendicular to the axis of the shafts. The two casing parts can be made of die cast aluminum. Preferably, the front casing part 2 should be constructed in a single piece with the clutch housing for the input coupling. The rear casing part should preferably be constructed in a single piece. As can be seen best in FIG. 3, the gear shafts 6 and 7 are supported by anti-friction ball bearings at one end in the front casing portion 2 and at the other end in the rear casing portion 3. Shaft 5 is supported within the bore at the rear of shaft 4 by a roller bearing. At the rear of drive shaft 4 there is an integrally formed drive pinion 8 that is continuously in meshing engagement with a gear 9 located on the first intermediate shaft 6 and on the other side with a gear 10 located on the second intermediate shaft 7. A gear 11 is formed integrally with or fixedly secured to intermediate shaft 6. Gears 13 and 14 are journalled on shaft 6 on opposite axial sides of a first synchronizer coupling 12. Gears 16 and 17 are journalled on intermediate shaft 7 on opposite axial sides of a second synchronizer coupling 15.

At the end of output shaft 5 facing drive shaft 4 is another synchronizer coupling 18. Pinion 19 is journalled on output shaft 5 adjacent synchronizer 18 and four pinion 20, 21, 22 and 23 are formed integrally with output shaft 5. pinions 13 and 14 are continuously engaged with gears 21 and 22, respectively. Gear 17, on the intermediate shaft 7, is continuously engaged with pinion 23. Gear 16 on intermediate shaft 7 is engaged with a reverse idler 24 that operates to drive pinion 20 on the output shaft 5. Gear 19 on the output shaft 5 is continuously engaged with gear 11 on intermediate shaft 6.

The gear shift rail 25 is located above the coaxial drive shaft 14 and output shaft 5 and is connected to a gear shift lever that is controlled manually by the vehicle operator. Gear shift rail 25 carries a selector finger 27 that extends radially outward from its axis. A checkplate 26 is mounted on rail 25, has a slot into which selector finger 27 extends and has outwardly extending flanges that abut blocking surfaces formed on the interior surface of the transmission housing. The flanges of checkplate 26 fit within slots formed on axially extending arms 28, 29, and 30 formed on the shift forks 31, 32, and 33, respectively. Selector finger 27 is rotated into engagement with recesses on the fork arms 28–30 as shift rail 25 rotates.

Shift fork 32 is slidably mounted on the shift rail 25 and transmits shift rail motion to the synchronizer 18. Shift forks 31 and 33 are slidably mounted on guide rails 34 and 35, respectively, above the intermediate shafts 6 and 7 to transmit shift rail motion to synchronizers 12 and 15, respectively.

Since the guide rails 34, 35 on which shifts forks 31 and 33 are slidably mounted are located below the selector finger 27 on shift rail 25, there is a risk that pull out torque might lead to an impairment of the shifting motion. Therefore, according to the invention, two radial auxiliary arms 37, 38 are formed on the sleeve 36, which carries the selector finger 27 on the shift rail 25. The fork-shaped ends of the arms 37, 38 engage lugs 39 and 40 formed on the sleeve portion of the shift forks 31 and 32 when the selector finger 27 has been rotated into engagement with the corresponding shift fork.

Since the recesses formed in the fork arms 28, 30 and the lugs 39, 40 on the sleeve portion of the shift forks 31, 33 are machined on one component and because the selector finger 27 on the sleeve 36 adjacent the auxiliary arms 37, 38 is machined on one component, it is possible that the shifting movement of the shift rail can be transmitted to the synchronizers 12, 15 by the fork arms 28, 30 and by the auxiliary arms 37, 38. Alternatively, the tolerances of the recesses in the arms 28 and 30 can be adjusted so that shifting movement is transmitted only through the auxiliary arms 37, 38, in which case the grooves in the fork arms 28 and 30 serve essentially to block the unselected shift forks when they are engaged by the checkplate 26.

Figure 4:
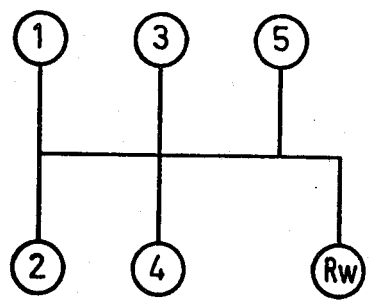
FIG. 4 is the shifting diagram of the variable speed transmission.
Figure 5:
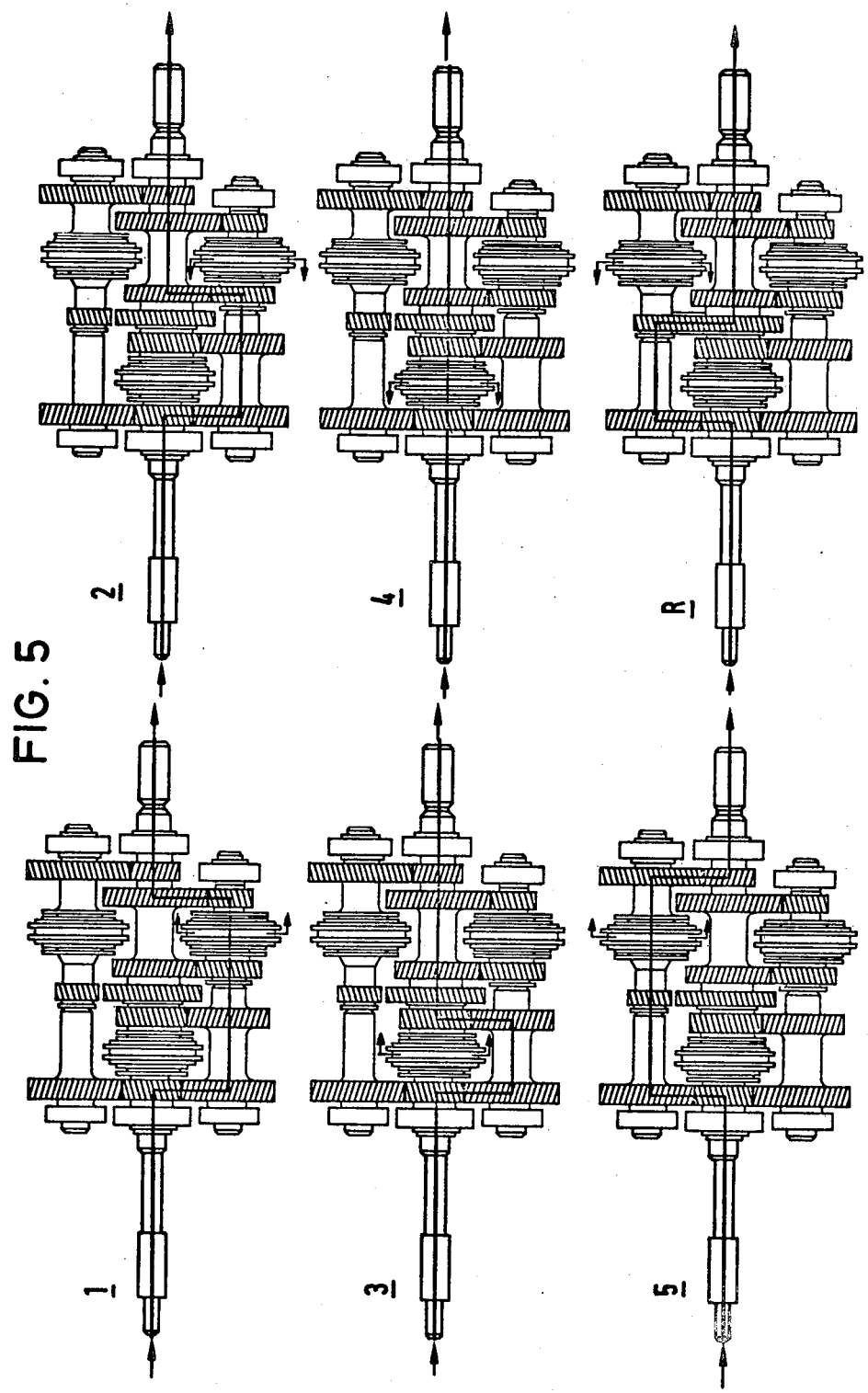
FIG. 5 shows six views of the gear arrangement of the transmission in which the direction of the shifting force applied to the synchronizers is indicated.

The gear shifting lever is moved by the vehicle operator among the five forward gears and the reverse gear according to the shifting diagram shown in FIG. 4. The torque transmission path for each of the five forward speed ratios and the reverse drive ratio are indicated by a solid line in each of the views of FIG. 5. In each case, the synchronizer that is moved to produce the selected forward drive or reverse drive is shown by small arrows pointing in the direction the synchronizer is moved to produce this ratio. The fourth speed ratio is 1:1 and the fifth speed ratio is an overdrive ratio.

The reverse drive idler 24 is assembled in a U-shaped bearing block 42 that is nested in a space formed in a front casing portion 2. In this way, the structure of the casing parts 2 and 3 are kept simple and easy to manufacture and the reversing idler is easily assembled in the housing.

The variable speed transmission according to this invention has short, rigid shafts which are a consequence of a compact design. Further, the moments of inertia are considerably reduced because the synchromesh couplings are mounted on three individual shafts. All of the five forward speed ratios as well as the reverse drive are produced with synchronized shifting.

Having described the preferred embodiment of my invention what I claim and desire to secure by U.S. Letters Patent is:

1. A variable speed ratio manual transmission comprising:
   an input shaft having a drive pinion fixed thereon;
   an output shaft coaxial with the input shaft having a first synchronizer coupling adapted to selectively drivably connect the input shaft to the output shaft, and first, second, third, fourth and fifth pinions;
   a first intermediate shaft having first and second gears drivably fixed thereto located on opposite axial ends of the first synchronizer coupling, a second synchronizer coupling mounted thereon, and third and fourth gears selectively drivably connectable to the first intermediate shaft by the second synchronizer coupling;

a second intermediate shaft having a fifth gear drivably fixed thereto, a third synchronizer coupling mounted thereon, and sixth and seventh gears selectively drivably connectable to the second intermediate shaft by the third synchronizer coupling;

a reverse idler pinion engaged with the second pinion and sixth gear;

the third, fourth and fifth pinions being continuously drivably engaged with the third, fourth and sixth gears, respectively, the first pinion being continuously drivably engaged with the second gear, the first and fifth gears being continuously engaged with the drive pinion;

a shift rail extending parallel to the input and output shafts having a selector finger fixed thereto;

first and second shift fork shafts;

a first shift fork movable on the shift rail and second and third shift forks movable on their respective shift fork shafts, the forks being adapted to move the first, second and third synchronizer couplings to produce selective driving engagement between the shaft on which the synchronizer couplings are mounted and the pinions and gears that the synchronizer couplings engage, the shift forks being selectively engagable by the selector finger; and a checkplate mounted on the shift rail fixed against axial movement and adapted to block axial movement of two of the shift forks and to permit axial movement of the shift fork with which the selector finger is engaged;

wherein the selector finger is connected to the shift rail by a sleeve having first and second auxiliary arms extending outward from the shift rail and wherein the shift forks that move the synchronizer couplings on the intermediate shafts have lug portions that are engaged selectively by the first or second auxiliary arms upon rotation of the selector finger into engagement with the corresponding shift fork in order to transmit the shift rail motion to the shift fork.

2. The transmission according to claims 1 comprising a gear box housing having two portions mechanically connected at a junction running perpendicular to the input, output and intermediate shafts, approximately at the axial midpoint of the length of the intermediate shafts, the front housing portion being formed of one piece with a clutch housing.

3. The transmission according to claim 2 further comprising a fixture to hold a bearing block in which the reverse idler pinion is mounted and wherein the front housing portion is adapted to receive the fixture therein.

* * * * *